United States Patent [19]

Jameson

[11] 4,022,498
[45] May 10, 1977

[54] FLUID LOADING ARM SWIVEL JOINT

[75] Inventor: Neal E. Jameson, Orange, Calif.

[73] Assignee: FMC Corporation, San Jose, Calif.

[22] Filed: Feb. 24, 1975

[21] Appl. No.: 552,092

[52] U.S. Cl. ................................. 285/16; 141/387;
285/168; 285/181; 285/276
[51] Int. Cl.² ........................................ F16L 55/00
[58] Field of Search .......... 285/276, 277, 379, 281,
285/98, 16, 168, 181; 141/387; 137/615

[56] References Cited

UNITED STATES PATENTS

| | | | |
|---|---|---|---|
| 2,833,566 | 5/1958 | Meyer et al. | 285/379 X |
| 3,433,488 | 3/1969 | Grantom | 285/276 X |
| 3,473,830 | 10/1969 | Haley | 285/276 X |
| 3,497,244 | 2/1970 | Grantom | 285/98 X |
| 3,724,499 | 4/1973 | Huniu | 137/615 |
| 3,825,045 | 7/1974 | Bloomquist | 137/615 |
| 3,850,454 | 11/1974 | Paddington | 285/379 X |

FOREIGN PATENTS OR APPLICATIONS 456,875  11/1963  United Kingdom ............... 285/276

*Primary Examiner*—Dave W. Arola
*Attorney, Agent, or Firm*—W. W. Ritt, Jr.; C. E. Tripp

[57] ABSTRACT

A marine loading arm equipped with an improved pipe swivel joint at the outer end of the arm's triple-swivel coupling assembly that functions to connect the outer end of the arm to the manifold flange of a marine tanker. The weight and axial dimension of this improved swivel joint are less than that of conventional swivel joints of the same pipe diameter, so that the coupling flange at the distal end of the triple-swivel assembly rests in a more vertical attitude, thereby easing the task of coupling the arm to the tanker's manifold flange and reducing the moment load imposed on that flange. The improved swivel joint also includes an arrangement for gaining quick and easy access to its packing chamber when replacing the packing between the joint's relatively rotatable elements becomes necessary.

7 Claims, 4 Drawing Figures

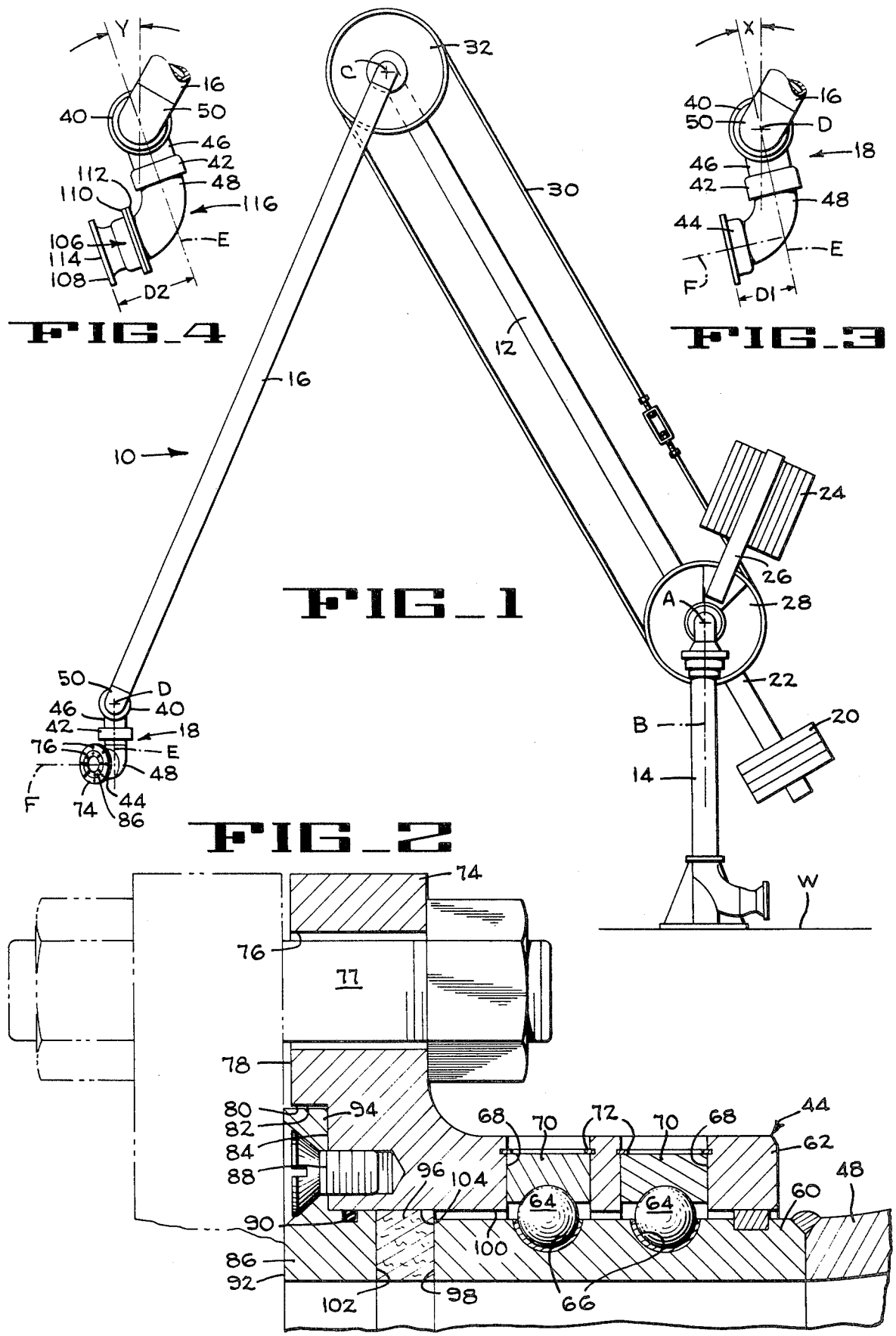

FLUID LOADING ARM SWIVEL JOINT

BACKGROUND OF THE INVENTION

This invention relates to pipe swivel joints, and more particularly to swivel joints designed especially for use on marine loading arms. Patents on apparatus of this type can be found in class 137, subclass 615, class 141, subclass 387, and various subclasses of class 285 of the classification of United States Patents.

Transferring petroleum and other fluid cargo between a reservoir facility and a marine tanker requires the use of a non-rigid connection between the reservoir and the tanker in order to compensate for movement of the tanker in response to tide, currents, wind, and the change in cargo level. The most satisfactory apparatus for this purpose is a marine loading arm, a crane-like device comprising a plurality of fluid-conducting pipe booms interconnected by swivel joints and counterbalanced on a vertical support called a riser, the riser being connected to a reservoir facility and the outer or distal end of the outermost pipe boom having a triple-swivel joint assembly with an end flange for connecting the arm to the manifold flange of the tanker. Devices of this type are illustrated and described in Bily U.S. Pat. No. 3,382,893 issued on May 14, 1968, and the contents thereof are expressly incorporated herein by reference.

One of the problems associated with the use of some styles of loading arms is the effort required to maneuver the arm's end flange into position for connecting it to the tanker's vertical manifold flange. When at rest the arms end flange normally resides in a somewhat downwardly-facing attitude, i.e., at an angle between horizontal and vertical, and thus must be raised into coupling position. Usually this is done by hand, but often the combined weight of the flange and that portion of the triple-swivel coupling assembly that must be lifted is too much for a man to overcome, especially where the larger arms, such as those with pipes of 16 to 24 inches in diameter, are involved. Although some triple-swivel assemblies are configured so that the end flange when at rest is disposed in a vertical attitude, the extra pipe elbows required to accomplish this attitude not only increase the cost but also impose a considerable amount of moment load on the arm, thereby requiring the use of heavier counterweights and proportionately larger supporting elements. Thus, the standard triple-swivel assembly such as that described in the foregoing Bily patent, is still preferred for many installations, and any reduction in the angle from the vertical at which its end flange resides comprises a valuable improvement in the ease with which this type of assembly can be utilized.

Another problem associated with the standard triple-swivel assembly is that the packing between the relatively rotatable elements of the swivel joints is often both difficult and time consuming to service or replace. This is particularly true when the assembly is of large diameter and therefore very heavy, and especially when the swivel joint must be completely disassembled in order to obtain access to its packing chambers.

SUMMARY OF THE INVENTION

The improved fluid loading arm swivel joint of the present invention comprises an inner or male element connected to the outer end of the final pipe elbow of the arm's triple-swivel coupling assembly, and an outer or female element rotatably surrounding the male element and terminating in an annular end flange that provides a means to connect the loading arm to a marine tanker's manifold flange. The face of the end flange of the swivel joint is counterbored to accept a packing retainer ring that is removably positioned therein, thereby providing quick and easy access to the packing chamber of the joint, i.e., merely by removal of this retainer ring, without having to otherwise disassemble the joint. This packing retainer ring is dimensioned so that its outer radial surface corresponds in position and function to the raised radial face of a standard raised-face pipe flange normally employed at the outer end of a triple-swivel assembly for connecting the loading arm to the tanker flange, thereby facilitating the use of standard ring gaskets between this swivel joint and the tanker's flange.

Since the male element of the swivel joint of this invention is connected to the outer end of the final elbow of the loading arm's triple-swivel assembly, and the coupling assembly's end flange extends from the swivel joint's female element, the axial length and the overall weight of this joint are significantly less than that of a conventional joint of the same diameter wherein the female element is attached to the elbow and the end flange is connected to the male element. This reduction of length and weight enables the loading arm's end flange to rest in a more vertical attitude, therefore making it easier to manually raise the flange into a vertical position for connecting it to the tanker's manifold flange. Furthermore, the reduced weight of this swivel joint permits the use of lighter handling equipment, and the reduced length of the joint results in the end flange residing significantly closer to the axis through the coupling assembly's second, i.e., intermediate, swivel joint, thereby achieving a significant reduction in moment load imposed by the assembly on the tanker's manifold flange when it is coupled thereto.

Another very important advantage provided by the swivel joint of the present invention is the marked improvement in access to the joint's packing. Because of the unique reverse orientation of this swivel joint, i.e., wherein the male element is connected to the coupling assembly's final elbow and the female element carries the assembly's end flange, and the employment of a removable packing retainer ring in a counterbore in the distal end of the female element, access to the packing can be quickly and easily obtained merely by removing the packing retainer ring. Nothing else including further disassembly of the joint, need be done to gain entry to the joint's packing chamber, for the packing retainer ring provides the distal wall of this chamber, and when this ring is removed the chamber is fully exposed. As will be readily recognized, this advantage cannot be achieved unless the swivel joint is oriented on the coupling assembly in this reverse manner.

One object of the present invention is to provide an improved swivel joint especially for use on a coupling assembly at the outer end of a marine loading arm.

Another object of the present invention is to provide a means to reduce the angle from the vertical at which the end flange of a marine loading arm coupling assembly resides in its rest position.

Another object of the present invention is to provide an improved swivel joint which, when employed in a certain orientation on the final elbow of a marine loading arm triple-swivel coupling assembly, results in reduced weight and length of the coupling assembly.

Still another object of the present invention is to provide a triple-swivel coupling assembly for a marine loading arm that is easier and more readily positioned for connection to the manifold flange of a marine tanker.

Yet another object of the present invention is to reduce the moment load imposed on a marine tanker manifold flange by a marine loading arm's coupling assembly.

A still further object of the present invention is to provide an improved manner of gaining access to the packing of a swivel joint on the outer end of a marine loading arm.

Other objects and advantages of the present invention will become readily apparent from the following description thereof, including the accompanying drawings.

BRIEF DESCRIPTION OF THE DRAWINGS

FIG. 1 is a diagrammatic view in side elevation of a double counterbalanced marine loading arm with a pipe swivel joint according to the present invention on the distal end of the arm's triple-swivel coupling assembly.

FIG. 2 is an enlarged fragmentary view in side elevation and in section of the inventive swivel joint of FIG. 1, showing how its end flange would be bolted to a marine tanker's manifold flange.

FIG. 3 is a diagrammatic fragmentary view in side elevation, on a reduced scale, of a triple-swivel coupling assembly on the end of a marine loading arm according to the present invention, showing the reduced angle from the vertical at which the assembly's end flange on the swivel joint of the present invention resides when the assembly is at rest, and also indicating the dimension of the distance between the face of this flange and the axis through the assembly's second or intermediate swivel joint.

FIG. 4 is a view like FIG. 3, showing the greater angle from the vertical of the end flange, when at rest, of a conventional triple-swivel assembly on the end of a marine loading arm, and also greater distance between this assembly's end flange face and the axis through its second swivel joint.

DESCRIPTION OF THE PREFERRED EMBODIMENT

Attention is directed first to FIG. 1 wherein a swivel joint according to the present invention is diagrammatically shown on a triple-swivel coupling assembly at the outer end of a double-counterbalanced marine loading arm. The loading arm 10 comprises an inboard fluid conducting arm section 12 pivotally mounted on an upstanding fluid-conducting riser 14 for movement with respect thereto about a horizontal axis A and a vertical axis B, an outboard fluid-conducting arm section 16 pivotally connected to the inboard arm section 12 for movement with respect thereto about another horizontal axis C, and a fluid-conducting triple-swivel coupling assembly 18 at the outer end of the outboard arm section 16 for connecting the loading arm 10 to the manifold flange of a marine tanker (not shown). The loading arm 10 is mounted on a warf W, and the riser 14 is connected by suitable pipe to a reservoir (not shown) for petroleum or other fluid products.

As in conventional double-counterbalanced loading arms, the inboard section 12, the outboard section 16 when in a vertical attitude, and the coupling assembly 18 are counterbalanced about the axis A by a primary counterweight 20 mounted on a support 22 that extends rearwardly from the inboard section 12. When the outboard section 16 is out of a vertical attitude, i.e., as shown in FIG. 1, this section and the coupling assembly 18 are counterbalanced about the axis C by a secondary counterweight 24 mounted on a support 26 that is fixed to an inner sheave 28. The sheave 28 is mounted on the riser 14 for rotation about the axis A independent of the inboard arm section 12, and is linked by an endless cable 30 to an outer sheave 32 that is mounted on the outer end of the inboard arm section 12 for rotation independently of said inboard arm section about the axis C. The outboard arm section 16 is fixed to the sheave 32 and thus pivots with it about the axis C, and the cable 30 assures that the sheaves 28, 32 cannot be rotated independently of each other.

The triple-swivel coupling assembly 18 (FIGS. 1 and 3) comprises a first or inner pipe swivel joint 40 oriented on a horizontal axis D, a second or intermediate pipe swivel joint 42 oriented on an axis E that is always perpendicular to the axis D, and a third or outer pipe swivel joint 44 of the present inventive style, said swivel joint 44 oriented on an axis F that is always perpendicular to the axis E. The swivel joints 40, 42 are interconnected by a 90° pipe elbow 46, the swivel joints 42, 44 are interconnected by another 90° pipe elbow 48, and the assembly 18 is connected by a swivel joint 40 to still another 90° pipe elbow 50 at the distal end of the outboard arm section 16. This assembly 18 thus provides rotational movement between the loading arm 10 and a marine tanker's manifold flange about the three axes D, E, and F, in the conventional manner.

As illustrated on an enlarge scale in FIG. 2, the swivel joint 44 of the present invention comprises an inner or male conduit element 60 welded or otherwise connected to the outer end of the coupling assembly elbow 48, an outer or female conduit element 62 surrounding the male element 60, and a plurality of bearings balls 64 in annular raceways 66 for interconnecting the male and female elements in a swivelable manner. In order to install and remove the bearing balls 64 the female element 62 is provided with ports 68 that furnish access to the raceways 66, and in the conventional manner these ports 68 are closed by removable plugs 70 held in place by snap rings 72.

The outer or distal end of the female element 62 terminates in a radially-extending annular flange 74 that constitutes the end flange of the triple-swivel coupling assembly 18. This end flange 74 is usually provided with circumferentially spaced holes 76 to accommodate bolts 77 for releasably coupling the arm 10 to a marine tanker manifold flange (shown in phantom in FIG. 2).

As seen in FIG. 2, the face 78 of the end flange 74 is counterbored at 80, establishing a cylindrical surface 82 and a radial surface 84, to accept a packing retainer ring 86 of L-shaped configuration in cross-section. When in position in the counterbore 80, the retainer ring 86 is removably secured to the end flange 74 by a plurality of circumferentially spaced screws 88 threaded into the swivel joint's female element 62, and an O-ring or other suitable annular seal 90 establishes a fluid-tight barrier between the female element 62 and the retainer ring 86.

The face, i.e., outer radial surface, 92 of the packing retainer ring 86 is spaced outwardly from the face 78 of the end flange 74 an amount corresponding to that of the raised face of a standard raised face pipe flange (not shown), and the diameter of the retainer ring's radial portion 94 is the same as raised face, thereby facilitating the use of standard ring gaskets (not shown) as a seal between the coupling assembly's end flange 74 and the tanker manifold flange to couple the loading arm 10 and the tanker manifold in a fluid-tight manner. Thus, no special gaskets, seals, or the like are required when the swivel joint 44 of the present invention is employed as described herein.

An annular packing element 96, held in place against the end face 98 of the swivel joint's male element 60 and the surface of the bore 100 of the joint's female element 62 by the packing retainer ring 86, establishes a dynamic fluid-tight seal between the elements 60, 62. The packing is dimensioned so that it is compressed between the retainer ring's inner end surface 102 and the end surface 98 of the male element 60 when the retainer ring screws 88 are tightened. Thus, the surfaces 98, 100, 102 define an annular packing chamber 104, access to which is quickly and easily gained simply by removing the retainer ring 86. This advantage is present only with a swivel joint 44 that is constructed and oriented on the loading arm's coupling assembly 18 as described above, for it should be noted that to gain access to the packing in a conventionally oriented swivel joint 106 (FIG. 4), i.e., wherein the female element is connected to the final elbow 48 of the coupling assembly, either the bearing balls and the flanged male element 108 must be removed, or the entire swivel joint 106 disconnected from the elbow 48 at the flanges 110, 112. Thus very significant savings in time and effort are achieved when servicing the packing of a swivel joint in accordance with the present invention.

As has been briefly mentioned earlier, the axial dimension of the swivel joint 44, i.e., the distance between the face 78 of the end flange 74 and the distal end of the coupling assembly's final elbow 48, is significantly less than the corresponding dimension of a conventionally oriented swivel joint such as 106 in FIG. 4. Because of this dimensional difference, the distance D1 (FIG. 3) between the end flange face 78 and the axis E of the second or intermediate swivel joint 42 of the coupling assembly 18 is also significantly less than the corresponding distance D2 (FIG. 4) of a conventional triple-swivel coupling assembly 116, and the center of gravity of the coupling assembly 18 is closer to the axis E than is the center of gravity of the coupling assembly 116.

The result of the foregoing is that the end flange 74 of the coupling assembly 18 rests at an attitude that defines a smaller angle X (FIG. 3) with the vertical than the angle Y (FIG. 4) defined by the attitude of the end flange 114 of the conventional coupling assembly 116 when at rest. Thus the present invention produces the advantage that less effort is required to raise the end flange 74 into a vertical attitude, necessary for connecting it to a tanker manifold flange, than required to lift the end flange 114 of a conventional coupling assembly 116 into the vertical. Furthermore, because of these unique and inventive features the coupling assembly 18 imposes less downward moment load on the tanker manifold flange than is imposed by the coupling assembly 116, another very desirable result particularly when coupling to manifold of marginal strength.

Although the best mode contemplated for carrying out the present invention has been herein shown and described, it will be apparent that modification and variation may be made without departing from what is regarded to be subject matter of the invention.

I claim:

1. In a fluid loading arm for transferring fluid between a reservoir facility and a fluid transport vessel, said arm comprising a fluid conducting arm section pivotally connected to a support, and a coupling assembly for connecting the arm section to the transport vessel, said coupling assembly including a pipe section, terminal flange means for releasably securing the coupling assembly to a fluid conduit on said transport vessel, and a pipe swivel joint assembly interconnecting said pipe section and said terminal flange means, said pipe swivel joint including inner and outer conduit elements rotatably interconnected by rollable bearing means, said pipe swivel joint further including packing means for establishing a fluid-tight dynamic seal between said inner and outer conduit elements, and packing retainer means removably securable to said terminal flange means to facilitate servicing said packing means without further disassembly of said swivel joint, and wherein the packing retainer means, the outer conduit element, and the inner conduit element together form an annular packing chamber for the packing means, and wherein said inner conduit element of said swivel joint is secured to said pipe section of said coupling assembly, and said outer conduit element of said swivel joint is secured to said terminal flange means to reduce the axial length and overall weight of said coupling assembly as compared with a coupling assembly of the same size but with the positions of the swivel joint conduit elements reversed.

2. A fluid loading arm according to claim 1 wherein the packing retainer means presses the packing means against the inner conduit member to establish a fluid-tight seal therewith.

3. A fluid loading arm according to claim 1 wherein removal of the packing retainer means exposes the packing means for servicing or replacement thereof while the swivel joint remains assembled and connected to the fluid loading arm.

4. A fluid loading arm according to claim 1 wherein the packing retainer means resides in a counterbore in the distal end of the outer conduit element.

5. A fluid loading arm according to claim 1 wherein the packing retainer means comprises an annular body that extends into the bore of the outer conduit element to form one wall of an annular packing chamber.

6. A fluid loading arm according to claim 1 wherein the terminal flange means has a radial face for positioning against an opposed fluid conduit flange face on said transport vessel, and wherein the packing retainer means includes an outer radial face that is raised from the radial face to the terminal flange means for supporting a standard ring gasket between said terminal flange means and said opposed fluid conduit flange face on said transport vessel.

7. In a fluid loading arm for transferring fluid between a reservoir facility and a fluid transport vessel, said arm comprising a fliud conducting arm section pivotally connected to a support, and a coupling assembly for connecting the arm section to the transport vessel, said coupling assembly comprising three pipe swivel joints interconnected by two pipe elbows, the first swivel joint interconnecting said coupling assembly and the loading arm, and said three swivel joints being capable of orientation about mutually perpendicular axes, the third pipe swivel joint of said coupling assembly including inner and outer conduit elements rotatably interconnected by rollable bearing means, and wherein said inner conduit element of said third pipe swivel joint is secured to one of said pipe elbows, and said outer conduit element of said third pipe swivel joint is secured to a terminal flange means to reduce the axial length and overall weight of said coupling assembly as compared with a coupling assembly of the same size but with the positions of said swivel joint conduit elements reversed.

* * * * *

UNITED STATES PATENT OFFICE
CERTIFICATE OF CORRECTION

Patent No. 4,022,498                Dated May 10, 1977

Inventor(s) NEAL E. JAMESON

It is certified that error appears in the above-identified patent and that said Letters Patent are hereby corrected as shown below:

Col. 1, line 33, change "arms" to --arm's--.

Col. 5, line 3, after "same as" add --said--.

Col. 6, line 54, change "to" to --of--.

*Signed and Sealed this*

*Ninth Day of October 1979*

[SEAL]

Attest:

RUTH C. MASON
*Attesting Officer*

LUTRELLE F. PARKER
*Acting Commissioner of Patents and Trademarks*